Feb. 24, 1970  J. W. S. WEED  3,497,433
BIPOLAR ELECTROLYTIC CELL AND PROCESS OF OPERATING SAID CELL
Filed June 1, 1967
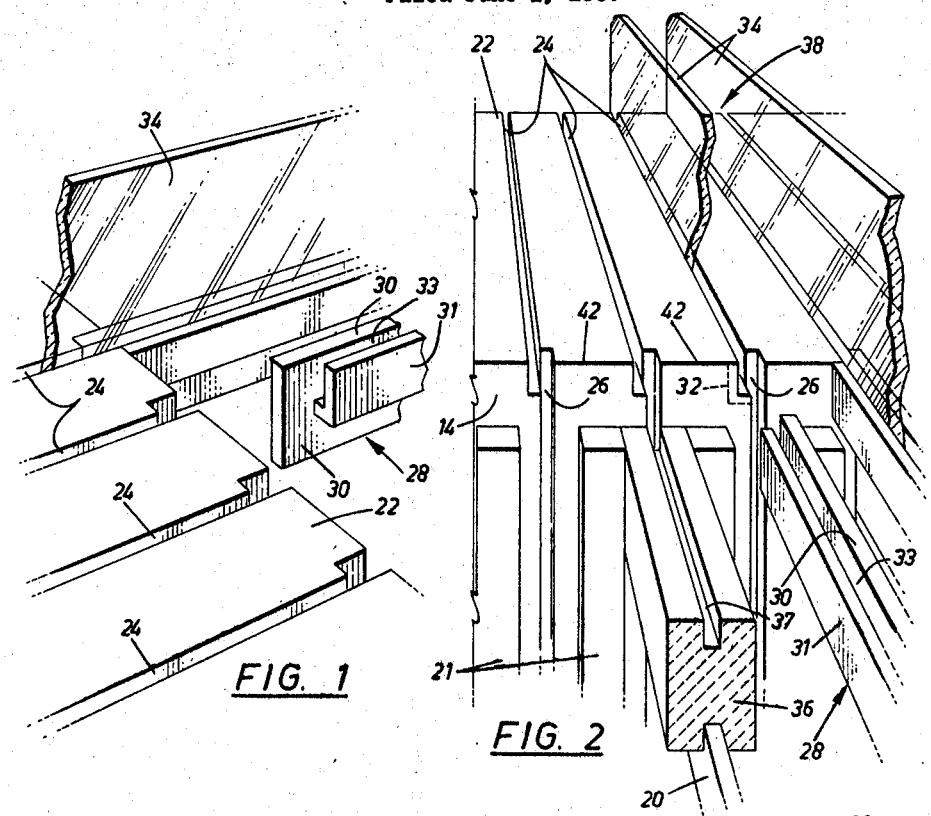
FIG. 1
FIG. 2
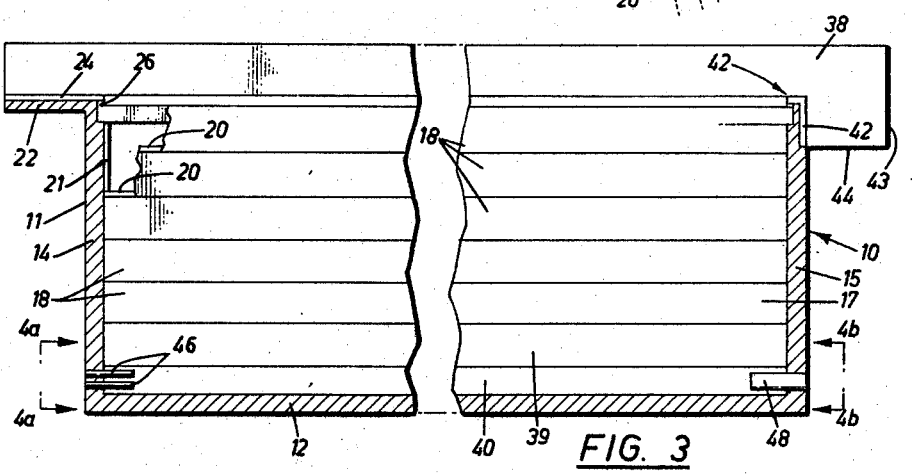
FIG. 3
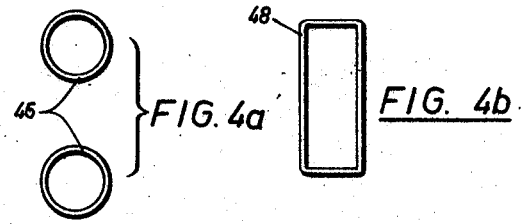
FIG. 4a        FIG. 4b
JOHN W. S. WEED
INVENTOR.
BY
Attorney United States Patent Office 3,497,433
Patented Feb. 24, 1970

3,497,433
BIPOLAR ELECTROLYTIC CELL AND PROCESS
OF OPERATING SAID CELL
John W. S. Weed, Buckingham, Quebec, Canada, assignor to Electric Reduction Company of Canada, Ltd., Islington, Toronto, Ontario, Canada
Filed June 1, 1967, Ser. No. 642,778
Int. Cl. B01k 3/04
U.S. Cl. 204—95                              8 Claims

ABSTRACT OF THE DISCLOSURE

An electrolytic process and an electrolytic cell including a plurality of parallel, vertical electrodes, each pair of adjacent electrodes defining a unit cell. Each unit cell has a conduit near the bottom for the admission of electrolyte to the unit cell, and an open channel at the top for the escape of electrolyte from the unit cell.

---

This invention relates to bipolar electrolytic cells.

More particularly, this invention relates to bipolar electrolytic cells especially suited to the production of halates, perhalates, or hypohalites of alkali metals, especially chlorates, e.g., sodium chlorate.

The basic construction of bipolar electrolytic cells to which this invention relates involves a rectangular enclosure consisting of two end walls and two parallel side walls, and a number of vertical electrodes extending parallelly between the side walls. Each pair of adjacent electrodes define between them a unit cell. Usually, the enclosure containing the electrodes is partly immersed in a larger reaction tank containing the electrolyte. In the case of sodium chlorate production, the electrolyte is sodium chloride solution. Conventionally, the enclose is closed at the bottom and open at the top. For each unit cell, tubes are provided in both side walls close to the bottom edges thereof to permit entry of the electrolyte into the unit cell. Electrolyte passes upwardly through each unit cell and exits therefrom through one or more tubes located in both side walls close to their top edges. Upward circulation of the electrolyte through each unit cell is promoted by the production of small gas bubbles, usually hydrogen, at one or both of the electrode surfaces in the unit cell. The gas bubbles reduce the overall density of the electrolyte in the unit cell, and the latter tends to rise. Both the inlet and the outlet tubes are located below the elecrolyte level inside the enclosure.

One way of wiring an electrolytic cell of the above type is to apply a positive voltage to the electrode at one end, and a negative voltage to the electrode at the other end, such that a step-wise gradation of electrical potential is set up in the intervening bipolar electrodes. The end electrodes, of course, are not bipolar. In order to ensure that the flow of electrical current is confined to the electrolyte and the electrodes, the electrolyte in any two adjacent cells is separated by partitions of glass, polyvinyl chloride, or other electrically inert substance.

Despite this partitioning, which extends upwardly above the electrolyte level in the cell, it often occurs that foam accumulates above the surface of the electrolyte in the unit cells to the point where it creates a bridge overtop of the glass or polyvinyl chloride partition, thus permitting the electrical current to bypass one or more electrodes over which the bridge occurs. Another danger relates to the metallic hood which is commonly located above the enclosure. It is possible for the foam build-up to reach such a proportion that it contacts the hood and causes short-circuiting between the hood and the bus drops. The sparks and electrical arcs resulting from either of these kinds of short-circuits can cause hydrogen fires during the production of sodium chlorate since hydrogen is continuously evolved in the unit cells during sodium chlorate production.

It is an object of this invention to prevent an accumulation of foam by permitting the latter to be drawn off away from the enclosure into the reaction tank and there dispersed.

Another object of this invention is to provide a less expenesive way of removing electrolyte from the cell than is possible with the use of tubes.

A further object of this invention is to reduce the frictional resistance to electrolyte flow through the unit cells, and to limit current leakage between adjacent unit cells.

In accordance with this invention, there is provided, in a method for the electrolysis of electrolyte, the steps of (a) providing an electrolytic cell of a type comprising an enclosure which includes two opposed upstanding side walls, a plurality of vertical electrodes extending parallelly betwene said side walls, each pair of adjacent electrodes defining between them a unit cell, conduit means for the introduction of electrolyte into each unit cell, at least one passageway at the top of each electrolytic cell for the escape of electrolyte therefrom, the lateral limits of said passageway being defined by electrically insulative lateral walls, the lower limit of said passageway being defined by a weir margin extending between said lateral walls, (b) introducing electrolyte through said conduit means into each unit cell, (c) electronlyzing the electrolyte in each unit cell, and (d) maintaining a rate of electrolyte outflow from each unit cell sufficient to establish above said weir margin an air-electrolyte interface within said passageway, thereby to prevent, in the neighborhood of said weir margin, the commingling of outflowing electrolyte from adjacent unit cells.

Two embodiments of this invention are shown in the accompanying drawings, in which like numerals refer to like parts throughout the several views, and in which:

FIGURES 1 and 2 are partially broken-away and partially exploded perspective views showing the first embodiment of this invention;

FIGURE 3 is a cross-sectional view of an electrolytic cell showing, at upper left and upper right respectively, the first and second embodiments of this invention, and at lower left and lower right respectively, the prior art and the novel construction of the electrolyte inlet conduits;

FIGURES 4a and 4b are side elevational views as seen at the lines 4a—4a and 4b—4b in FIGURE 3.

Turning first to FIGURE 3, an electrolytic cell 10 is seen to comprise an enclosure 11 which includes two end walls (not visible in FIGURE 3), a bottom wall 12, and two opposed upstanding side walls 14 and 15. A plurality of vertical bipolar electrodes extend parallelly between the side walls 14 and 15, and in FIGURE 3 one such electrode 17 is shown to consist of a number of horizontal graphite planks 18. The graphite planks 18 may be linked together in the usual way by splines 20. Each pair of adjacent electrodes define between them a unit cell, and the gap between electrodes for each unit cell is determined by the thickness of the permanent spacers 21 which can be seen in FIGURES 2 and 3. The permanent spacers 21 are attached to the side walls 14 and 15, and the graphite planks are adapted to slide down the slots between the spacers 21.

In FIGURE 3, the first embodiment of this invention is shown at the upper left. In this first embodiment, the side wall 14 has an outwardly projecting horizontal flange 22 at its upper edge. As shown in FIGURES 1, 2 and 3, the flange 22 has a plurality of horizontal slots 24 cut part way into it in a direction at right-angles to the side wall 14. Along the inner face of the upstanding side wall 14 there is a plurality of vertical slots 26 which are immediately adjacent, and thus offset from, the horizontal slots 24.

An elongated polyvinyl chloride Y-member 28 is adapted to have one of its ends inserted into the vertical slot 26. In this first embodiment, of course, the other side wall 15 would be constructed identically with side wall 14, and accordingly the other end of the polyvinyl chloride Y-member 28 would fit into a similar slot in the flange at the upper edge of the upstanding side wall 15. As best seen in FIGURE 1, the Y-member 28 consists of an elongated plate member 30, and an auxiliary L-shaped portion 31. It will be noted that the L-shaped portion 31 terminates a certain distance short of the end of the plate member 30. With this construction, the plate member 30 can lodge within the vertical slot 26, while at the same time the L-shaped portion 31 abuts against the inside surface of the side wall 14, its profile being shown in dotted line at 32 in FIGURE 2. It will be appreciated that the groove 33 between the portion 31 and the plate member 30 of the Y-member 28 is adapted to be aligned with the appropriate horizontal slot 24, such that a partition 34, made preferably of glass or polyvinyl chloride, can be fitted into both the slot 24 and the groove 33. As shown particularly in FIGURE 2, the uppermost graphite plank 36 of each electrode has a slot 37 in its upper surface, and the slot 37 is adapted to align itself with the vertical slot 26, such that the plate member 30 of each Y-member 28 can be inserted in both of these slots.

Turning now to FIGURE 3, the lowermost graphite plank 39 has an upward groove in its lower edge which permits it to fit over a polyvinyl chloride or glass partition 40, the latter completely sealing one unit cell from an adjacent unit cell at the bottom.

When the bipolar electrodes are in place with the polyvinyl chloride Y-member 28 inserted into the slot 37, and the glass or polyvinyl chloride partitions 34 likewise inserted into the slots 24 and 33, each unit cell (the space between two adjacent electrodes) has a passageway 38 along which electrolyte and foam can escape from the particular unit cell, without danger of foam building up to the point where it bridges overtop the partition 34 and short-circuits the cell.

Turning to FIGURE 2, it will be seen that each passageway 38 has its lateral limits defined by the partitions 34, and that the upper inner edge 42 of the flange 22 constitutes a weir margin (which will also be denoted 42) defining the lower limit of the passageway 38. Of course, the entire upper surface of the flange 22 defines the bottom of the passageway 38, but if we speak only of that portion of the passageway 38 which is immediately adjacent the top of the upstanding side wall 14, we can describe its lower limit as being defined by the weir margin 42.

The essence of the method according to this invention is to so adjust the electrolysis conditions within the electrolytic cell described above, that a rate of electrolyte outflow from each unit cell is maintained which is sufficient to establish above the weir margin 42 an air-electrolyte interface within the passageway 38, thereby to prevent, in the neighbourhood of the weir margin 42, the commingling of outflowing electrolyte from adjacent unit cells. Put more simply, the level of the outflowing electrolyte in the passageway 38 is not permitted to rise above the top of the partitions 34. It will be appreciated that the advantage of this invention which relates to the elimination of foam build-up is obtained regardless of the height of the outflowing electrolyte in the passageway 38. For the optimum conditions of electrolyte flow, however, it is of particular advantage to maintain the height of the air-electrolyte interface within the passageway 38 at between 0.5 and 1.0 times the width of the passageway 38. This preferred range of electrolyte height within the passageway 38 is related to the fact that the rate of electrolyte flow in a conduit of any kind can be generally considered to be inversely proportional to the length of the conduit, and inversely proportional to the wetted perimeter. Firstly, it will be readily appreciated that, regardless of the height of electrolyte in the passageway 38, the total wetted perimeter in an open-topped channel must be less than the wetted perimeter of a channel with a closed top whose cross-sectional area is the same as the cross-sectional area of the electrolyte flowing in the open-topped channel. The advantage of an open over a closed channel becomes more pronounced, however, as the dimensions of the flowing liquid in the open-topped channel approach the condition where the height of the flowing liquid is one-half the width of the channel (assuming that the channel is rectangular). This is easily calculated as follows:

Assume that the cross-sectional area of the flowing electrolyte is A, and that we are to calculate the width w of an open-topped rectangular channel for which the wetted perimeter will be the least.

For a width w, the height of the flowing liquid will be $A/w$.

The wetted perimeter is thus $$w + \frac{2A}{w}$$

If we now set the differential of the foregoing expression equal to 0, the theory of maxima and minima indicates that if we solve the equation for w, we will have the width at which the wetted perimeter, for a given area A, is the least.

$$\frac{d}{dw}\left(w + \frac{2A}{w}\right) = 0$$

$$1 - \frac{2A}{w^2} = 0$$

$$w = \sqrt{2A}$$

$$\text{height} = \frac{A}{w} = \frac{A}{\sqrt{2A}}$$

Thus, $\frac{\text{height}}{\text{width}} : \frac{A/\sqrt{2A}}{\sqrt{2A}} = \frac{1}{2}$ It is thus seen that the optimum ratio of height to width is 1:2.

Even though the optimum height to width ratio is 1:2, simple calculation will show that, with a height of anywhere from $0.5w$ to $1.0w$, the total wetted perimeter will still be less than it would be in a filled circular conduit of the same cross-sectional flow area.

After the electrolyte in two adjacent passageways 38 reaches the outer end of the passageways, the two flows will of course intermingle. If any current leakage takes place between two adjacent unit cells, such current leakage would have to follow a path down one passageway 38 and back along the adjacent passageway 38. It has been found that current leakage of this sort generally is directly proportional to the cross-sectional flow area in the passageway, and is inversely proportional to the length of the passageway. In this situation, for a given passageway width, the current leakage will be approximately proportional to the height of electrolyte flow in the passageway 38. The best way of reducing current leakage to a minimum is to make the flange 22 sufficiently wide.

The second embodiment of this invention is shown at the right in FIGURE 3. In the second embodiment, the flange 22 is omitted, and instead the grooves 24 for the glass or polyvinyl chloride partitions 38 are extended down the outside of the upstanding side wall 15 as shown at 42. The glass partition 38 is L-shaped to permit it to fit down into the slot 42. It will be appreciated that any current leakage is forced to follow a path the length of which is determined by the distance of the edges 43 and 44 from the weir margin 42 at the top of the upstanding side wall 15.

At the bottom left of FIGURE 3 is shown one of the commonly used arrangements for permitting entry of the electrolyte from the reaction tank into the enclosure 10. Two tubes 46 are provided in vertical alignment within each unit cell. FIGURE 4a shows this arrangement. This is disadvantageous in that the wetted perimeter of the inflowing electrolyte is fairly large and contributes to frictional resistance to electrolyte flow. This invention provides that the tubes 46 be replaced by a single sluice box 48 shown at the lower right in FIGURE 3 and in FIGURE 4b which is shaped to have the same cross-sectional area as the sum of the cross-sectional areas of the two tubes 46, but has a smaller total wetted perimeter than the tubes 46. In present-day electrolytic cells, there is provision for the entry of electrolyte at both sides of each unit cell, this being required in order to prevent stagnation of electrolyte within the unit cell. Due to this consideration, the present invention contemplates provision of a sluice box 48 at either side of each unit cell. It will be appreciated however that, in theory at least, the frictional drag on the entering electrolyte could be even further reduced by combining the two sluice boxes 48 into one larger sluice box of the same area but of smaller wetted perimeter.

While, for the sake of simplicity, this invention has been described with reference to bipolar electrolytic cells in which all of the electrodes are bipolar with the exception of the end electrodes, the electrodes being connected in series electrically, it will be appreciated that the invention also may be of advantage with certain kinds of monopolar electrolytic cell arrangements such as those in which the monopolar cells are connected in series electrically but in parallel with regard to the flow of electrolyte.

It has been found that if the passageways 38 are so dimensioned, and if the electrolytic cell is so operated, that the ratio of the length of a passageway to the cross-sectional area of the electrolyte flowing in it is maintained at approximately 10:1 (units$^{-1}$), a satisfactory compromise is achieved between current leakage and frictional resistance to fluid flow. This ratio, however, is not to be considered a limitation of the invention.

Furthermore, although the instant invention has been described in connection with electrolytic cells employing graphite electrodes, it is to be understood that other kinds of electrodes could also be employed.

While preferred embodiments of this invention have been disclosed herein, those skilled in the art will appreciate that changes and modifications may be made therein without departing from the spirit and scope of this invention as defined in the appended claims.

What I claim as my invention is:

1. An electrolytic cell comprising:
   an enclosure closed at its bottom and open at its top, said enclosure including two opposed upstanding side walls, one of said side walls having at its top an outwardly projecting horizontal flange, said flange having an upper inner edge, said flange having upstanding from said edge a plurality of partitions,
   a plurality of vertical electrodes extending parallelly between said side walls, each pair of adjacent electrodes defining between them a unit cell,
   conduit means for the introduction of electrolyte into each unit cell,
   at least one passageway at the top of each unit cell for the escape of electrolyte therefrom,
   the lateral limits of said passageway being defined by electrically insulative lateral walls disposed parallelly between said side walls, each of said lateral walls being located atop each of said vertical electrodes, the lower limit of said passageway being defined by a said inner edge of said flange which constitutes a weir margin which extends between each of said lateral walls and which determines the level above which electrolyte must rise in the unit cell in order to escape therefrom, each of said partitions constituting a lateral wall between two adjacent passageways, said passageway being open at the top and extending outwardly away from said weir margin in the direction of electrolyte escape.

2. An electrolytic cell as claimed in claim 1, in which the enclosure and said flange are constructed of polyvinyl chloride, and in which said partitions are panes of glass.

3. An electrolytic cell comprising:
   an enclosure closed at its bottom and open at its top, said enclosure including two opposed upstanding side walls, one of said side walls having at its top a horizontal upper edge, said horizontal upper edge having upstanding from said edge a plurality of L-shaped partitions,
   a plurality of vertical electrodes extending parallelly between said side walls, each pair of adjacent electrodes defining between them a unit cell,
   conduit means for the introduction of electrolyte into each unit cell,
   at least one passageway at the top of each unit cell for the escape of electrolyte therefrom,
   the lateral limits of said passageway being defined by electrically insulative lateral walls disposed parallelly between said side walls, each of said side walls being located atop each of said vertical electrodes, the lower limit of said passageway being defined by said horizontal edge of said side wall which constitutes a weir margin which extends between each of said lateral walls and which determines the level above which electrolyte must rise in the unit cell in order to escape therefrom, each partition constituting a lateral wall between two adjacent passageways and extending downwardly along the outside of said one of said side walls as well as outwardly therefrom, said passageway being open at the top and extending outwardly away from said weir margin in the direction of electrolyte escape.

4. An electrolytic cell as claimed in claim 3, in which the enclosure and said flange are constructed of polyvinyl chloride, and in which said partitions are panes of glass.

5. In a method for the electrolysis of electrolyte, the steps of:
   providing an electrolytic cell of a type comprising an enclosure which includes two opposed upstanding side walls, a plurality of vertical electrodes extending parallelly between said side walls, each pair of adjacent electrodes defining between them a unit cell, conduit means for the introduction of electrolyte into each unit cell, at least one passageway at the top of each electrolytic cell for the escape of electrolyte therefrom, the lateral limits of said passageway being defined by electrically insulative lateral walls located atop each of said vertical electrodes, the lower limit of said passageway being defined by a weir margin extending between said lateral walls, one of said side walls having a horizontal upper edge constituting said weir margin, said horizontal upper edge having upstanding therefrom a plurality of partitions of L-shape, each partition constituting a lateral wall between two adjacent passageways and extending both downwardly along the outside of said one of said side walls and outwardly away from said horizontal upper edge,
   introducing electrolyte through said conduit means into each unit cell,
   electrolysing the electrolyte in each unit cell,
   and maintaining a rate of electrolyte outflow from each unit cell sufficient to establish above said weir margin an air-electrolyte interface within said passageway, thereby to prevent, in the neighbourhood of said weir margin, the commingling of outflowing electrolyte from adjacent unit cells.

6. A method as claimed in claim 5, in which the height of the air-electrolyte interface within said passageway is maintained at between 0.5 and 1.0 times the width of said passageway.

7. In a method for the electrolysis of electrolyte, the steps of:

providing an electrolytic cell of a type comprising an enclosure which includes two opposed upstanding side walls, a plurality of vertical electrodes extending parallelly between said side walls, each pair of adjacent electrodes defining between them a unit cell, conduit means for the introduction of electrolyte into each unit cell, at least one passageway at the top of each electrolytic cell for the escape of electrolyte therefrom, the lateral limits of said passageway being defined by electrically insulative lateral walls located atop each of said vertical electrodes, the lower limit of said passageway being defined by a weir margin extending between said lateral walls, one of said side walls having an outwardly projecting horizontal flange of which the upper edge constitutes said weir margin, said flange having upstanding therefrom a plurality of partitions, each partition constituting a lateral wall between two adjacent passageways and extending outwardly along said horizontal flange away from said weir margin, introducing electrolyte through said conduit means into each unit cell, electrolysing the electrolyte in each unit cell, and maintaining a rate of electrolyte outflow from each unit cell sufficient to establish above said weir margin an air-electrolyte interface within said passageway, thereby to prevent, in the neighborhood of said weir margin, the commingling of outflowing electrolyte from adjacent unit cells.

8. A method as claimed in claim 7, in which the height of the air-electrolyte interface within said passageway is maintained at between 0.5 and 1.0 times the width of said passageway.

References Cited

UNITED STATES PATENTS

| 1,026,857 | 5/1912 | Fixen | 204—268 |
| 3,350,286 | 10/1967 | Crane | 204—269 |
| 3,389,071 | 6/1968 | Meyers | 204—269 |
| 3,405,051 | 10/1968 | Crane | 204—269 |

FOREIGN PATENTS

| 741,311 | 8/1966 | Canada. |
| 741,312 | 8/1966 | Canada. |

JOHN H. MACK, Primary Examiner

A. BEKELMAN, Assistant Examiner

U.S. Cl. X.R.

204—267, 268, 269